UNITED STATES PATENT OFFICE.

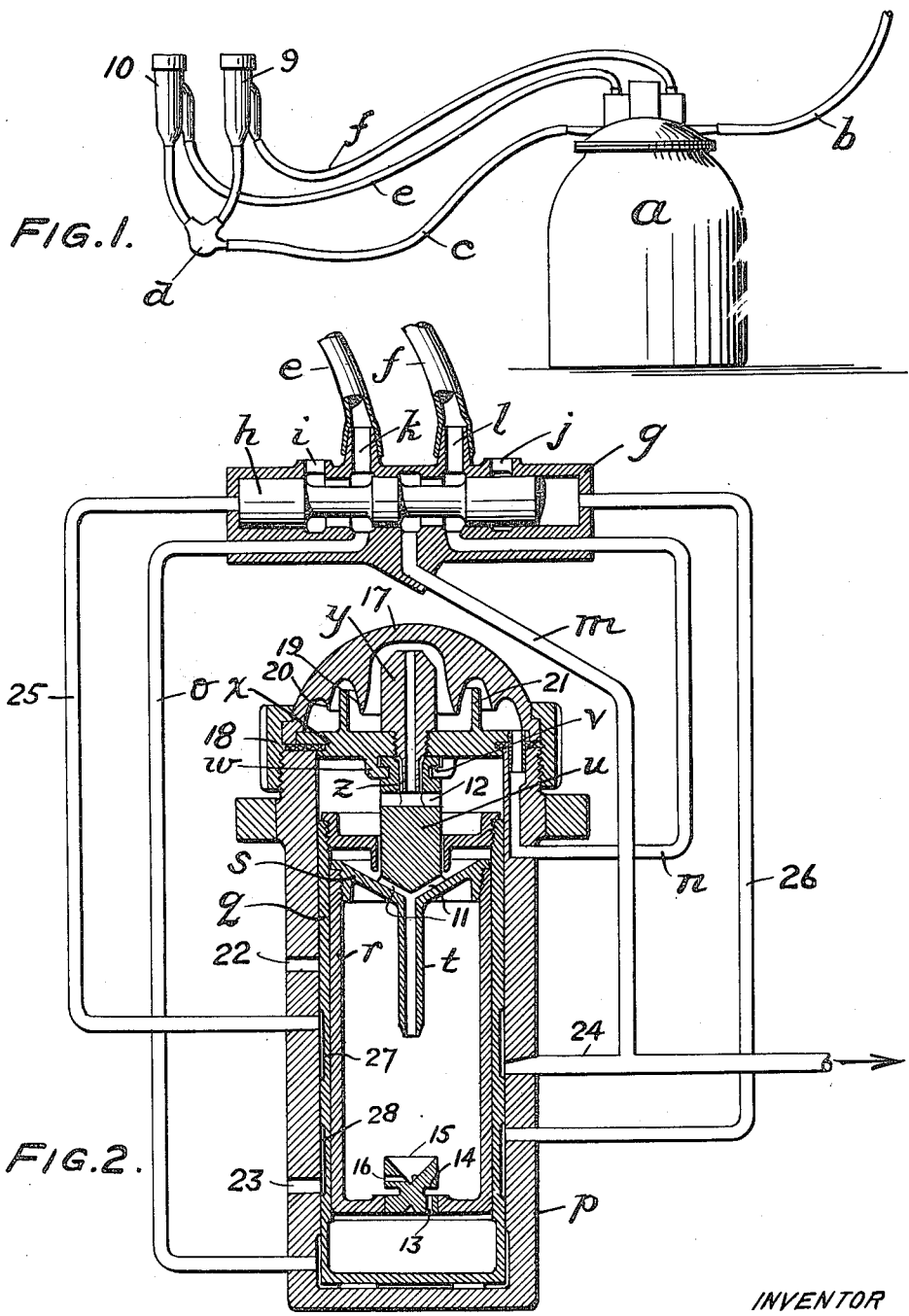

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

MILKING-MACHINE PULSATOR.

1,322,589.     Specification of Letters Patent.     Patented Nov. 25, 1919.

Application filed November 21, 1918. Serial No. 263,447.

*To all whom it may concern:*

Be it known that I, MEREDITH LEITCH, a citizen of the United States, residing at Poughkeepsie, county of Dutchess, and State of New York, have invented a new and useful Improvement in Milking-Machine Pulsators, of which the following is a full, clear and exact description, reference being had to the accompanying drawings, which form a part of this specification.

My invention relates to milking machines in which the pulsator valve is moved by pneumatic power. It is more particularly an improvement in the pulsator shown in my patent application Serial No. 118,625, filed September 6, 1916.

One object of my invention is to make the pulsator more compact and of a more pleasing appearance. Another object is to prevent the escape of oil from the interior of the pulsator. A third object is to prevent the accidental entrance of water to the pulsator.

In the above mentioned application, I show, near the control cylinder, a chamber and a restricted passage through which oil could pass to and from the cylinder.

I have found it possible to make the control piston valve hollow and use the inside of it for a dashpot cylinder. It is also possible to make the dashpot plunger hollow and use the space thus provided for an oil reservoir. Peculiar arrangements of the connection to the dashpot plunger prevent the escape of oil or entrance of milk or water.

In the accompanying drawings: Figure 1 is a diagrammatic view of a complete milking unit. Fig. 2 shows the members of the control cylinder, piston, dashpot, etc., in cross-section and shows diagrammatically the pulsator cylinder and piston and the connecting passages.

The milk pail $a$ is connected by a flexible tube $b$ with a source of suction, not shown, and by another flexible tube $e$ with a cluster $d$ to which the milk tubes from the inner chambers of the several double chambered teat cups 9 and 10 are connected. The outer or pulsation chambers of the teat cups are connected by tubes $e$ and $f$ with the pulsator which I preferably build in the pail cover. In the drawing I have shown only two teat cups, but it is to be understood that each of these is to represent one of a pair of similar cups. The pulsator shown is particularly adapted for use with double chambered teat cups operating on the alternate system described in a patent heretofore issued to me, No. 1,196,000, dated August 29, 1916; but different ports and passages may be provided suitable for other systems of milking if so desired.

Referring now to Fig. 2: $q$ is a cylinder containing the reciprocable piston $h$. Ports $i$ and $j$ are atmospheric inlets. Ports $k$ and $l$ communicate through the tubes $e$ and $f$ with the teat cups, while passage $m$ communicates with a source of suction. The cylinder contains two other ports that open to the passages $n$ and $o$ which transmit pneumatic power to a cylinder $p$ in which the control valve piston $q$ reciprocates.

The piston $q$ is hollow and bored out to form the cylinder of an oil-filled dashpot with a plunger $r$ which is also hollow and forms a reservoir to hold oil for the dashpot. The upper end of the dashpot plunger $r$ is closed by a plug $s$ having a tube $t$ projecting downward, approximately to the center of the plunger. Another stem $u$ extends upward and has a groove $v$ near its top which engages with a ring $w$ secured to the under side of the head $x$ of the cylinder $p$ and so prevents vertical movement of the plunger $r$. The ring $w$ has an opening in one side to permit the insertion or removal of the stem $u$. A hollow member $y$ is screwed through the cylinder head $x$ and entering a hole $z$ in the upper end of the stem $u$ prevents its accidental disengagement from the ring $w$. Holes 11 lead from the tube $t$ to the outside of the stem $u$ at the upper side of the plug $s$ and a cross hole 12 connects the hole $z$ with the space around the stem $u$.

A small orifice 13 is provided through the bottom of the plunger $r$ and has a horizontal wall 14 above it. The button 15 which forms the wall 14 has a conical depression in its top and there are holes 16 that lead from this depression to the outside of the button.

The upper end of the cylinder $p$ is closed airtight by the cap 17 held down by the coupling ring 18. The under side of this cap has two sharp-edged depending rings 19 and 20. The upper side of the cylinder head $x$ has a ring 21 projecting upward between the rings 19 and 20.

In the cylinder $p$ there are two atmospheric ports 22, 23 and one vacuum port 24. The passage 25 leads to one end of the cylinder $g$ and the passage 26 to the other end. The piston $p$ has two wide grooves 27 and 28 around it.

The oil reservoir inside the plunger $r$ is a little less than half filled with oil.

With the piston $q$ in the position shown, atmospheric pressure through port 23, groove 28 and passsage 26 has reached the right hand end of cylinder $g$ and, because the air had an opportunity to escape from the left hand end through passage 25, groove 27 and port 24 to the source of suction, has forced the piston $h$ to the left. With the horizontal piston valve $h$ in the position shown, the inflator of cup 10 is receiving air at atmospheric pressure while that of cup 9 is exhausted. At the same time, atmospheric pressure through the passage $o$ is acting on the under side of the hollow piston $q$, while air is being exhausted through the passage $n$ from the upper side of that piston. The upward movement of the piston is slow, for it can proceed only as fast as the oil in the dashpot within the piston can be forced through the orifice 13 leading to the oil reservoir inside the dashpot plunger $r$. The oil emerges from the orifice 13 at high velocity, but is prevented from jetting upward toward the top of the reservoir by the horizontal surface 14. As the piston $q$ moves upward it shuts off communication between port 23 and passage 26 and between passages 25 and 24 and on approaching the upper end of its stroke opens communication between port 22 and passage 25, allowing air to enter the left end of cylinder $g$, and also opens communication between passages 26 and 24, allowing the air to escape from the right end of the cylinder. Piston $h$ will then move to the right and the inflator of cup 9 will receive air at atmospheric pressure while that of cup 10 will be exhausted. Air entering port $j$ will, through passage $n$, enter the upper end of cylinder $p$. It will then pass through the hole in member $y$, through hole 12 in stem $u$, down around the stem, inward through holes 11 and downward through tube $t$ to the inside of the hollow plunger $r$, where it will press on the top of the oil. This pressure will force oil through the orifice 13 into the space below the plunger $r$ where it will exert a downward pressure on the piston $q$ and, because the air from below the piston can escape through passage $o$, cylinder $g$ and passage $m$, will force the piston $q$ downward. This downward movement will be slow, because the small size of the orifice 13 limits the rate of flow of the oil. When piston $q$ reaches the bottom of its stroke it will be in the original position and the cycle will be repeated.

With the space inside the plunger $r$ less than half filled with oil, the machine may be turned bottom up without spilling any. Oil that adheres to the button 15 will drop off while bottom up, but because of the depression in the center, will drop to one side of the tube $t$. While, during normal operation, piston $q$ is moving upward, a small quantity of oil may leak up around plunger $r$, this will flow into the hollow on top of the plug $s$ and downward through the holes 11 and tube $t$ back into the reservoir in the plunger $r$. It is thus seen that in no position of the machine will oil escape.

It sometimes happens that an operator connects the milk pipe of a cup with the pulsator and the pulsation pipe with the milk claw. In such a case milk is liable to get into passage $o$ or $n$. If it gets into passage $o$ it will, because $o$ connects with the bottom of cylinder $p$, be forced back through the same passage. If it enters passage $n$ it might, if $n$ opened directly into the upper part of the cylinder $p$, enter the plunger $r$, flow downward and mix with the oil in the reservoir. In the construction shown the passage $n$ ends under the edge of cap 17, so that any milk carried from it by the current of air will strike the under side of the cap and be deflected downward by the ring 20 outside of the ring 21. If some of the milk should be carried around the lower edge of ring 20 and over the top of 21, it will be thrown down a second time by the ring 19 outside of the member $y$. It is thus seen that there is little danger of milk entering the oil reservoir.

The arrangement of members, one inside the other, allows a construction with a neat appearance.

Having now fully described my invention, what I claim and desire to protect by Letters Patent is:

1. In a milking machine pulsator, in combination, a cylinder, a hollow piston within the cylinder, and a hollow plunger within the piston, said plunger and piston communicating to permit the passage of fluid from one to the other, and means to effect a relative reciprocation of the piston and plunger.

2. In a milking machine pulsator, in combination, a cylinder, a hollow piston reciprocable therein, and a hollow stationary plunger within the piston, said plunger being adapted to be partially filled with a liquid and having an orifice through which the liquid is adapted to be forced by the reciprocation of the piston.

3. In a milking machine pulsator, two relatively movable and hollow members adapted to contain a liquid and having a restricted port connecting their hollow interiors to permit the passage of liquid from one to the other, and means to admit motive fluid alternately to a pressure face of one member and to the body of liquid in the other member to effect a relative reciprocation of said members.

4. In a milking machine pulsator, in combination, a cylinder, a hollow piston within the cylinder, and a hollow plunger within the piston, and said piston and plunger communicating to permit the passage of a speed governing liquid from one to the other, and means adapted to pneumatically operate upon one of the two last named members to effect a relative movement thereof in one direction and adapted to operate upon the body of liquid to effect a relative movement of said members in the other direction.

5. In a milking machine pulsator, in combination, a cylinder, a hollow piston within the cylinder, and a hollow plunger within the piston, and said piston and plunger communicating to permit the passage of a liquid from one to the other, the plunger having an opening, and means adapted to pneumatically move said piston in one direction and force liquid therefrom into the plunger and alternately therewith to admit actuating fluid through said opening into the plunger and thereby force said actuating fluid into the piston and move it in the opposite direction.

6. In a milking machine pulsator, the combination with a cylinder and a valve therein, of a second cylinder and a hollow piston therein, a hollow plunger within the piston, said plunger and piston communicating to permit the passage of liquid from one to the other, the said cylinders having ports, motive fluid inlets and exhausts, and passages connecting said ports, whereby the movement of said valve effects a relative reciprocation of said piston and plunger and the latter reciprocation effects the reciprocation of said valve.

7. In a milking machine pulsator, the combination with a cylinder and a valve therein, a second cylinder and two relatively reciprocable hollow members therein, said members adapted to contain a liquid and having a restricted port connecting their hollow interiors to permit the passage of liquid from one to the other, the said cylinders having ports, motive fluid inlets and exhausts, and passages connecting said ports, said ports and passages adapted to convey pneumatic impulses whereby the relative reciprocation of said members causes motive fluid to reciprocate the valve and the reciprocation of the valve admits motive fluid alternately to a pressure face of one of said members and to the body of liquid to effect a relative reciprocation of said members.

8. In a milking machine pulsator, the combination with a cylinder and a valve therein, of a second cylinder, a hollow valve piston within the second cylinder, a hollow plunger within the valve piston and having an opening, said valve piston and plunger communicating to permit the passage of liquid from one to the other, the said cylinders having ports, motive fluid inlets and exhausts, and passages connecting said ports adapted to convey pneumatic impulses whereby the reciprocation of said valve piston causes motive fluid to reciprocate said valve and the reciprocation of said valve admits pressure fluid alternately to a pressure face of said valve piston and through said opening to the body of liquid in the plunger.

9. In a milking machine, the combination with teat cups, of a cylinder and a pulsator valve therein, a second cylinder and a hollow piston therein, a hollow plunger within the piston, said plunger and piston communicating to permit the passage of liquid from one to the other, the said cylinders having ports, motive fluid inlets and exhausts, passages connecting the ports of the two cylinders, and passages connecting the pulsator valve cylinder and the teat cups, whereby the movement of the pulsator valve conveys pneumatic impulses to the teat cups and effects a relative reciprocation of said piston and plunger and the latter reciprocation effects the reciprocation of the pulsator valve.

10. In a milking machine, the combination with teat cups, of a cylinder and a pulsator valve therein, a second cylinder and two relatively reciprocable hollow members therein, said members adapted to contain a liquid and having a restricted port connecting their hollow interiors to permit the passage of liquid from one to the other, the said cylinders having ports, motive fluid inlets and exhausts, passages connecting the ports of the two cylinders, and passages connecting the pulsator valve and teat cups, whereby the relative movement of said members conveys pneumatic impulses to reciprocate the pulsator valve and the reciprocation of the pulsator valve conveys pneumatic impulses to the teat cups and admits motive fluid alternately to a pressure face of one of said members and to the body of liquid to effect a relative reciprocation of said members.

11. In a milking machine, the combination, with teat cups, of a cylinder, a hollow piston reciprocable therein, a hollow stationary plunger within the piston, said plunger having an orifice and adapted to be partially filled with a liquid which is forced therethrough by the reciprocation of the piston, a second cylinder and a piston reciprocable therein, and ports and passages adapted in the movement of the first piston to convey pneumatic impulses to reciprocate the second piston and in the movement of the second piston to convey pneumatic impulses to reciprocate the first piston and to convey pneumatic impulses to operate the teat cups.

12. In a milking machine pulsator, in combination, a cylinder, a hollow piston reciprocable therein, a hollow stationary plunger within the piston, said plunger adapted to be partially filled with a liquid and having an orifice through which the liquid is forced by the reciprocation of the piston, and means to prevent the jet from the orifice reaching the surface of the liquid.

13. In a milking machine pulsator, the combination with a cylinder and a hollow dash pot plunger therein affording an oil reservoir, of a centrally depressed plug closing the upper end of the plunger and a tube depending from the plug, thereby permitting entrance of air to the reservoir, and preventing outflow of oil when the pulsator is reversed.

14. In a milking machine pulsator, in combination, a cylinder, a hollow piston reciprocable therein, a hollow stationary plunger within the piston, a plug for the plunger having a central depression with a tube depending therefrom, said plunger having an orifice in its lower end and adapted to be partially filled with a liquid which is forced through said orifice by the reciprocation of the piston.

15. In a milking machine plunger, in combination, a hollow piston, a plunger in the piston, there being a liquid passage through the bottom of the plunger communicating with the interior of the piston, a central member in the lower part of the plunger overlying said liquid passage and having a depression in its upper face, a plug at the top of the plunger, and an axially disposed tube depending from the plug through which motive fluid may pass from above the plunger into the interior thereof.

16. In a milking machine pulsator, the combination with a cylinder, of a hollow piston reciprocable therein, a hollow plunger in the piston, a head on the piston having a central opening, a plug on the plunger, a stem extending upward from said plug through said opening, and a head on the cylinder engaging said stem, there being a restricted passage for liquid between the hollow piston and hollow plunger.

17. In a milking machine pulsator, the combination with a cylinder, of a hollow piston reciprocable therein, a hollow plunger in the piston, a head on the piston having a central opening, a plug on the plunger, a stem extending upward from said plug through said opening, a head on the cylinder engaging said stem, there being a restricted passage for liquid between the hollow piston and hollow plunger, and a tube within the plunger depending from said plug, there being an air passage through said cylinder head, stem, piston head and plug to admit motive fluid to the interior of the plunger.

18. A closure for a pulsator cylinder comprising a spaced-apart head and cap with an upstanding ring on the head and depending rings on the under side of the cap adapted to throw downward any liquids impinging against the cap.

19. In a milking machine pulsator, the combination with a cylinder, of a dashpot comprising two hollow members, one fixed relatively to the cylinder and one movable relatively thereto and both adapted to contain liquid, there being a passage for the liquid from one member to the other, a head for the cylinder having a channel therethrough, a cap for the cylinder above the head and spaced therefrom, overlapping and spaced apart deflectors on the head and cap respectively and ports and passages through which pneumatic impulses may be conveyed to effect the reciprocation of the movable member, one of said passages including said channel and the space between the head and cap.

In testimony of which invention, I have hereunto set my hand, at Poughkeepsie, N. Y., on this 18th day of November, 1918.

MEREDITH LEITCH.